Nov. 12, 1935.　　　　C. F. JENKINS　　　　2,021,010
PERSISTING LUMINESCENT SCREEN
Filed Dec. 28, 1927
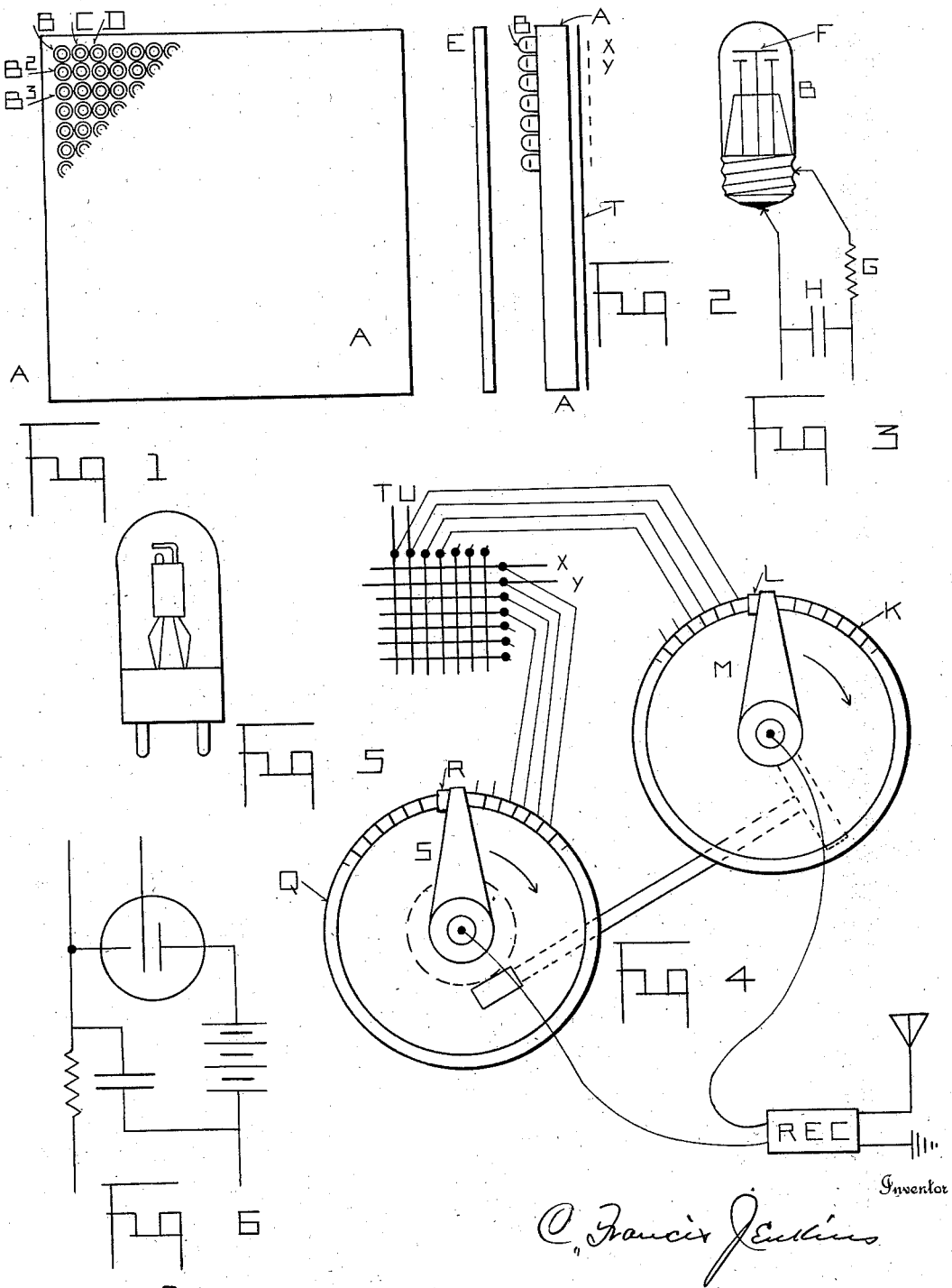

Patented Nov. 12, 1935

2,021,010

UNITED STATES PATENT OFFICE 2,021,010

PERSISTING LUMINESCENT SCREEN

Charles Francis Jenkins, Washington, D. C., assignor, by mesne assignments, to E. T. Cunningham, Inc., a corporation of Delaware Application December 28, 1927, Serial No. 242,989

1 Claim. (Cl. 178—6)

This invention relates to receiving apparatus for radio vision and radio movies, and has for its principal object means for securing greater illumination of the receiving screen, and permitting the employment of larger screens.

The present method of receiving radio vision and television images, or pictures, consists in transiently illuminating the picture plane in elementary areas corresponding to the elementary areas of the picture or object scanned by the mechanism at the distant transmitting station.

In these mechanisms, persistence of vision of the eye is depended upon to assemble the picture elements, the eye carrying the transient illumination of each elementary area until it is again illuminated by the scanning light spot again crossing the particular area considered.

Such transient illumination results in an effective light strength proportional to the fractional time-of-illumination each elementary area bears to the whole-time of one picture frame.

Assuming the frame to be divided into fifty lines vertically, and an equal number horizontally, or 2500 elementary areas to each frame; obviously the total illumination over the whole frame area is but 1/2500 part of the light intensity which would be available if each area were illuminated all the time.

It is to attain this high total illumination by the latter process, i. e., to keep all active elementary areas illuminated during the whole time of the scanning of each frame, or action part of the frame, that this invention is made.

Persistence of vision is the result of light intensity by time of application. If, therefore, the time be increased by 2500 fold, i. e., the time of scanning one frame, obviously either a brilliant picture may be obtained, or a picture 2500 fold in size and of elementary area intensity of transient illumination. The whole picture is lighted all the time, an even more efficient method than that employed in theatres where pictures are projected from motion picture film through an interrupting shutter.

With this and other objects in view, the invention consists of the method herein disclosed, and of the novel parts illustrated, all more particularly pointed out in the claim.

In the drawing, Figure 1 is a front view of a multiple lamp assembly; Figure 2 an edge view thereof; Figure 3 a detail of one of the lamps, shown here as a luminescent lamp, though suitable filament lamps may be used. Figure 4 is a schematic drawing of the switching gear employed to light the lamps singly and in a given sequence; and Figure 5 a glow-grid tube for "triggering off" the lamps if its use is desired; and Figure 6 its circuit.

In the figures A is a lamp frame; B, C, D, B2, B3, are lamps; E is a ground glass screen which may or may not be used in front of the lamps; F is the cathode glow-target of the lamps (see Fig. 3). G is a resistance in the lamp leads, and H a condenser. K is a disc commutator having a brush L, fastened to arm M, sweeping over the commutator. Q is a similar commutator, with its brush R, mounted on arm S. Each of the segments of commutator K is attached to a corresponding vertical lamp-bar, T and U, for example. Each of the segments of the commutator Q is attached to a corresponding horizontal lamp-bar, as at X and Y.

The number of segments in K corresponds to the number of vertical bars, and also to the number of lamps in a horizontal row. The number of horizontal bars correspond to the number of lamps in a vertical row.

The gearing which connects the shafts of the commutator brush-arm M to the commutator brush-arm S is such that the arm M makes a complete revolution while the brush R of the arm S travels the length of a single segment of commutator Q.

Lamp B is electrically connected to bar T and X; the next lamp in the horizontal row is attached to bar U and X. Succeeding lamps, serially in the first row, are connected each to its proper vertical bar, and all of them to horizontal bar X. So that, with current flowing, all of the lamps of the top row are lighted in sequence during a single revolution of the arm M. On the next revolution of the arm M the second row of lamps are serially lighted for the brush-arm S will have moved onto the adjacent segment, to which all the lamps of the second row are electrically connected.

Continued rotation of the brushes will eventually light all the lamps, for the lamps in each successive horizontal row are lighted in each successive revolution of brush L, and the whole picture frame is covered in one revolution of brush R. The brush-arm M makes as many revolutions during a single revolution of arm S as there are segments in commutator Q, i. e., as many revolutions as there are lamps in a vertical row.

It will be obvious that current from the plate battery of the radio receiver, e. g., any suitable radio set, will flow from the set to the arm M; thence to the segment with which its brush is in contact; to one of the vertical bars; through one of the lamps; to one of the horizontal bars; to a segment of Q; and thence through brush R and arm S back to the receiver.

Current flowing through such a circuit as described will flash one of the lamps. The lamp would instantly go out except that the current also charges the condenser H, and the lamp continues to glow until the charge leaks off through resistance G. Such values of H and of G are chosen as just keep the lamp aglow during a single revolution of arm S, or approximately so.

Grid-glow tubes may be inserted between the radio receiving set and the lamps, the grid and anode wires (the upper pair in Fig. 6) going to the receiving set, and the anode and cathode to the lamp. The particular advantage of the use of the tube is that less initial current is required.

In other words, the incoming signal "triggers off" in succession the lamps representing the elementary areas of the light portion of the picture or subject at the transmitting station, as usual, but the addition of suitable values of capacitance and resistance keeps these lamps aglow for a picture-frame time-period thereafter, resulting in a brilliancy of picture more than a thousand fold brighter than can possibly be obtained with light which does not persist after the exciting means has passed on.

Of course, many modifications of mechanisms are possible without departing from the principle herein disclosed, and I do not limit myself to that herein shown.

What I claim, is—

In an electro-optical system for producing images of a field of view, a source of potential, means for varying said potential in accordance with the tone values of successively scanned elemental areas, a plurality of lights, each having a pair of terminals selectively connected to said source of potential, each of the leads to said lights having a resistance connected directly to one of said terminals, and a condenser connected on one side to the other terminal of said light and on the other side to the terminal of said resistance away from said light.

CHARLES FRANCIS JENKINS.